Nov. 5, 1968  JAMES T. MATSUOKA  3,408,694
EXTRUDER
Filed Aug. 25, 1966  3 Sheets-Sheet 1

INVENTOR
JAMES T. MATSUOKA
BY
Watts, Hoffmann, Fisher & Heinke
ATTORNEYS

Nov. 5, 1968  JAMES T. MATSUOKA  3,408,694
EXTRUDER

Filed Aug. 25, 1966  3 Sheets-Sheet 2

INVENTOR
JAMES T. MATSUOKA
BY
Watts, Hoffmann, Fisher & Heinke
ATTORNEYS

United States Patent Office 3,408,694
Patented Nov. 5, 1968

3,408,694
EXTRUDER
James T. Matsuoka, Brecksville, Ohio, assignor, by mesne assignments, to Stewart Bolling & Co. Inc., Cleveland, Ohio, a corporation of Ohio
Filed Aug. 25, 1966, Ser. No. 575,132
4 Claims. (Cl. 18—12)

ABSTRACT OF THE DISCLOSURE

A slot-type die for a sheet or slab extruder split through the die slot parallel to the length thereof into at least two separate parts for facilitating opening and cleaning of the die.

---

The present invention relates to sheet or slab extruding apparatus for the rubber and other plastic industries, and more particularly to extruding apparatus having a die head provided with a slot from which the extruded material is fed directly to a calender or calender rolls.

The principal object of the invention is the provision of a novel and improved sheet or slab extruder having a slot-type die which can be quickly and conveniently opened for cleaning, etc.

Another object of the invention is the provision of a novel and improved slot-type die for a sheet or slab extruder which die is split or made of two relatively movable parts, in such a manner that it can be conveniently and quickly opened for cleaning, etc.

Another object of the invention is the provision of a novel and improved combination sheet or slab extruding and calendering apparatus in which the extruder part of the apparatus is movable toward and from the calendering part and comprising a slot-type die split through the die slot and adapted to have a part thereof carried by the calendering part of the apparatus and another part of the die crried by the extruding part of the apparatus as the extruding part of the apparatus is moved toward and from the calendering part whereby the die may be conveniently opened for servicing, cleaning, etc.

Another object of the invention is the provision of a novel and improved extruder for plastic material which will maintain a constant die back pressure at all times.

Figure 1:
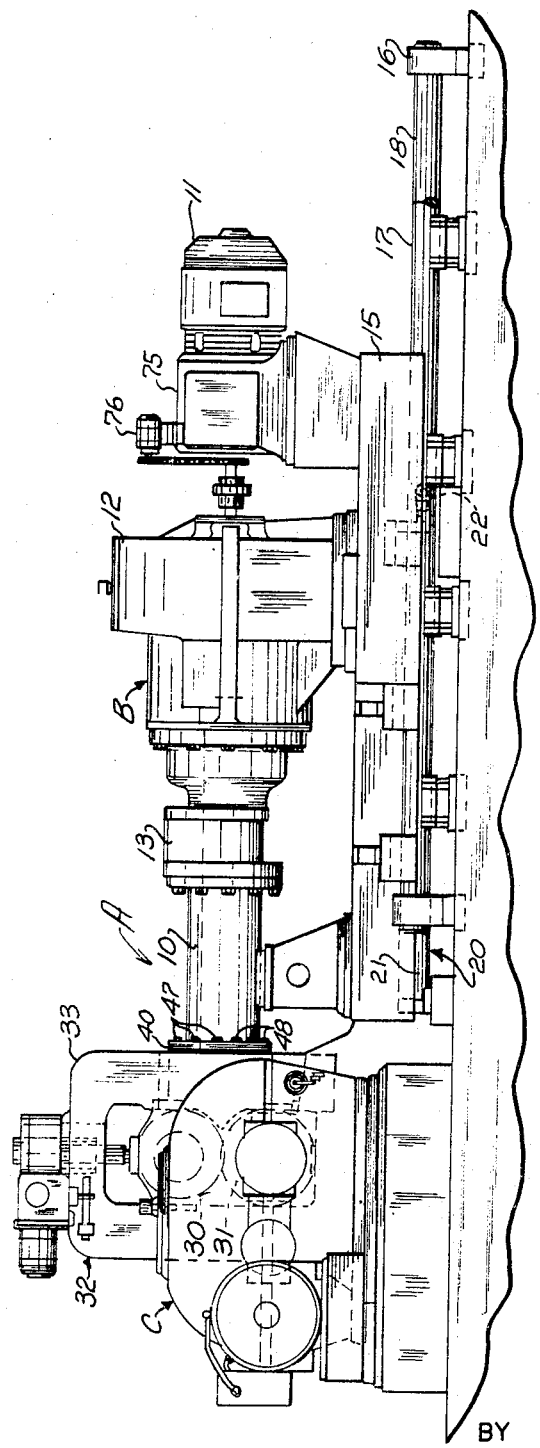
Figure 2:
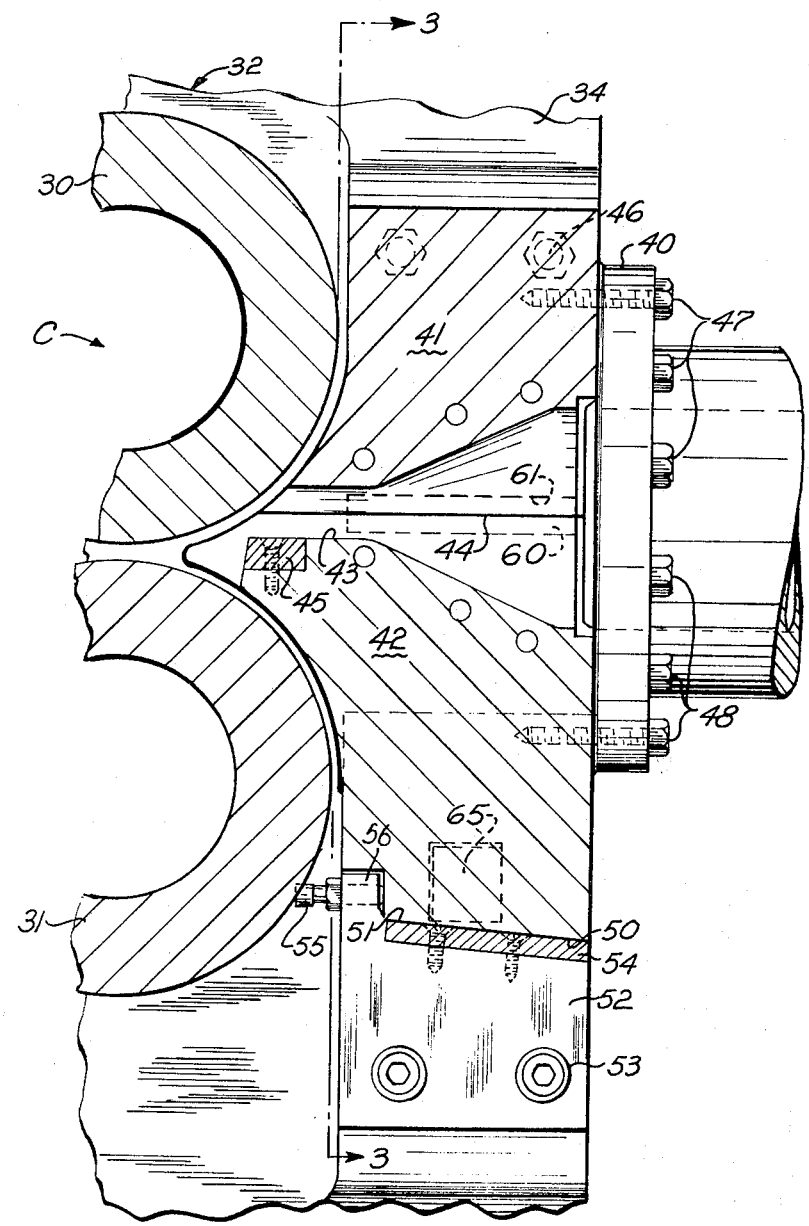
Figure 3:
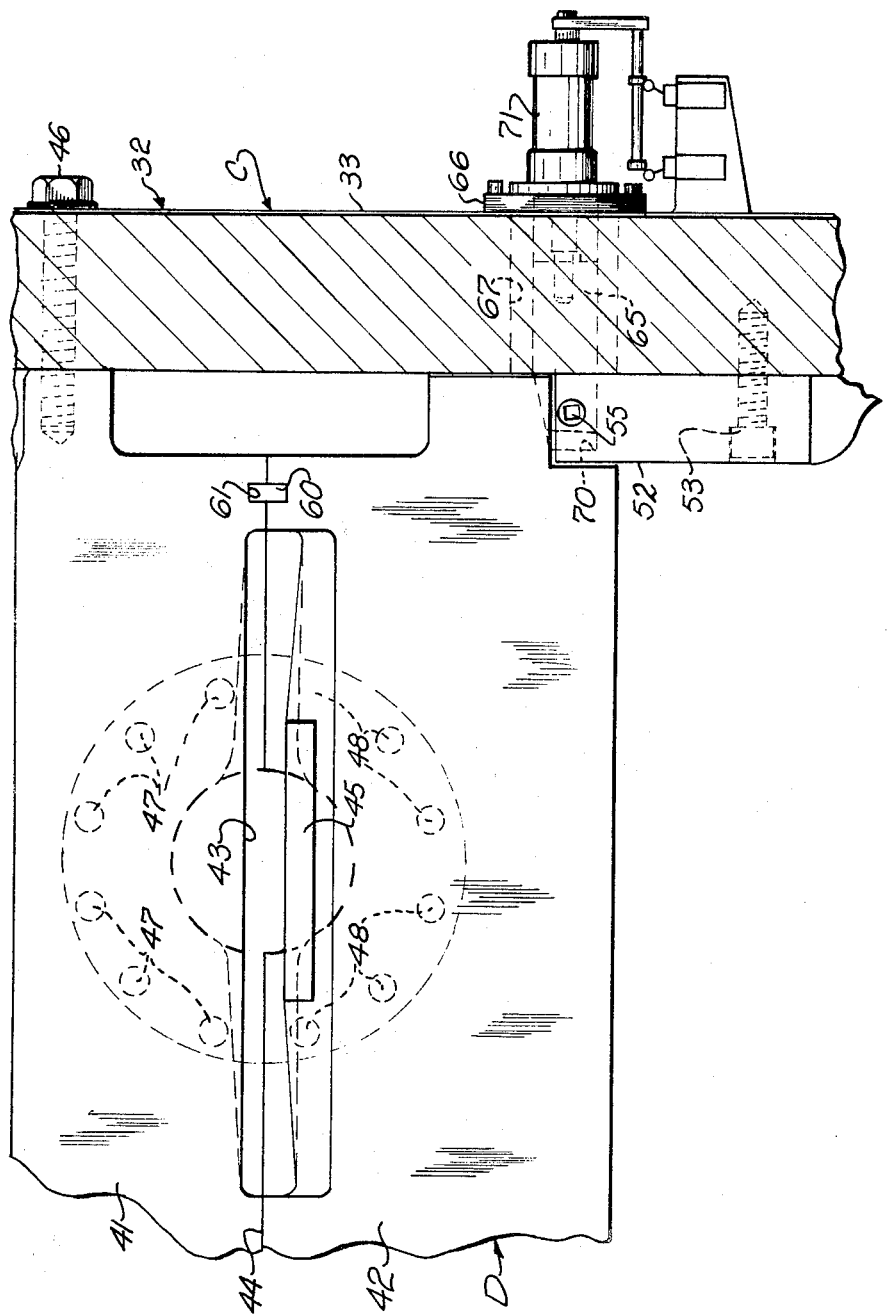

The invention resides in certain constructions and arrangements of parts and further objects and advantages of the invention will be apparent from the following description of the preferred embodiment described with reference to the accompanying drawings forming a part of this specification in which similar reference characters designate corresponding parts, and in which FIG. 1 is a side elevation of a combination extruding and calendering apparatus;

FIG. 2 is a fragmentary vertical sectional view of the die and adjoining portion of the apparatus shown in FIG. 1; and FIG. 3 is a fragmentary sectional view approximately on the line 3—3 of FIG. 2, but showing the die in elevation.

While the invention may be illustrated or incorporated in various apparatuses it is herein shown and described as embodied in a combination extruder and calender apparatus of the type employed in the rubber and other plastic industries in the manufacture of sheets and slabs. The complete unit is designated A. The extruder or extruding part B of the apparatus, except for the differences hereinafter mentioned, may be of any commercial construction and will not be described in detail except to say that the extruder proper, designated by the reference character 10, is of the screw type, is driven by a motor 11 through a suitable speed reducer 12 and has a hopper 13 into which the material to be extruded is fed in any known manner.

The extruder 10, electric drive motor 11 and speed reducer 12 are detachably mounted on a frame 15 slidably supported on a bed 16 comprising two fixed slide bars 17 and 18. The frame 15 is adapted to be moved toward and from the calender or calendering part C of the apparatus A by a hydraulic cylinder or reciprocating-type double-acting pressure-fluid motor 20 positioned between the slide bars 17 and 18 and having its cylinder 21 connected to the bed 16 while the piston rod 22 is connected to a cross-member of the frame 15.

The calender part C of the apparatus is stationary and except for the differences hereinafter noted, is of well known construction and will not be described in detail. Suffice it to say that it comprises two calender rolls 30, 31 supported, with the conventional adjustments, one above the other in a frame 32 comprising end frame members 33, 34. The rolls 30, 31 are driven by an electric motor through a suitable speed reducer.

In addition to the extruder part B and the calender part C, the apparatus A comprises a die unit, designated generally as D, interposed between a flange 40 on the end of the extruder proper and the calender rolls and which feed directly into the calender rolls. The die unit D is of the slot-type and is split horizontally into two parts 41 and 42 through the slot 43.

Aside from being split horizontally through the slot 43 along the line 44 and the manner in which it is supported, the die may be of any conventional slot-type die including desired cooling or heating passages and it will not be described in detail. The die is located between the end frame members 33 and 34 with the open end of the slot 43 adjacent to the opening between the rolls 30 and 31 but slightly above the same. A portion of the lower side wall of the slot 43 in the lower die member 42 is formed by a replaceable insert 45 which can be replaced by other inserts of different contour to change the distribution of the material as it is extruded from the die.

The top or upper die part 41 has its opposite ends bolted as by bolts 46 to the side frame members 33 and 34 and is carried by the frame of the calender part C of the apparatus. The lower die part 42 is not fixedly connected to the calender C but is connected to the extruder B and is adapted to be carried by and movable toward and from the calender with the extruder part of the apparatus.

During operation of the apparatus the upper die part 41 of the die D is preferably detachably connected as by the top bolts 47 to the upper part of the flange 40. In this event these bolts are removed before the extruder part B is moved away from the calender part C of the apparatus. The lower guide member 42, however, remains bolted as by the lower bolts 48 to the lower part of the flange 40 during movement of the extruder part B of the apparatus.

The under side of the lower die part 42 has an inclined surface 50 adjacent to each end thereof adapted to cooperate with tapered or inclined surfaces 51 on members 52 bolted as by the cap screws 53 to the side frame member 33, 34 below the die. The surfaces 50 and 51 are inclined upwardly toward the calender rolls at a slight angle, for example 5°. In the embodiment shown the surfaces 51 are on a renewable hard bronze wear plate 54 inserted in the top of the member 52. The construction is such that as the lower die part 42 is moved into position underneath the upper die part 41 it is moved upwardly by the cooperating inclined surfaces 50 and 51 into alignment with the calender rolls and engagement with the underside of the top die part 41. Adjustable stop screws 55 carried by a flange 56 on the member 52 are employed to adjust and limit the forward position of the lower die part 42 relative to the calender rolls and/or the upper die part 41. In order to assure proper alignment of the die parts 41 and 42 as the lower die part 42 is moved underneath the upper die part 41 suitable keys, such as the key 60 shown, may be provided at one or both sides of the die slot. The key 60 shown is carried by the lower die part 42 and engages in a suitable keyway 61 in the upper die part 41.

To assure that the two die parts 41 and 42 are in tight engagement with one another along the split line 44, and that the lower die part 42 is held against the stop screw 55 during operation of the apparatus, pressure fluid operated wedge members 65 are provided at opposite ends of the lower die member 42. The wedge members 65 are shown as incorporated in units 66 removably connected to opposite frame members 33 and 34 of the calender part of the apparatus. The wedge members 65 have end portions, the front and upper surfaces of which, as viewed in FIG. 3, are inclined or tapered and which end portions are adapted to be projected into or withdrawn from cooperating apertures 70 in opposite ends of the lower die member 42, by selective operation of the pressure fluid motors 71 of the double acting-type which motors also form part of the unit 66. The wedge members 65 are rectangular in cross section as are the apertures 67 in the lower die member 42 and the front and upper surfaces of the apertures 67 are inclined to cooperate with the inclined surfaces on the wedge members 65 to force the die member 42 toward the calender rolls and the upper die members. Any suitable control mechanism may be employed for supplying and exhausting fluid to and from the motors 71 and such control mechanism, which is preferably interlocked with the control for the motor 20 so as to prevent operation of the motor 20 with the ends of the wedges in the apertures 70, is not herein shown nor described. While cooling or heating means is not shown for the die D, it is to be understood that either or both parts of the die may be provided with suitable passages or conduit means for the circulation of a cooling or a heating fluid.

As previously mentioned one of the objects of the invention is to provide an apparatus of the character referred to wherein a constant die back pressure is maintained at all times in the extruder. This is accomplished in the preferred embodiment of the invention shown by the use of a General Electric Company Kinatrol drive unit comprising the induction motor 11 integrally mounted with an eddy current coupling 75 interposed between the motor 11 and the gear reducer 12. The drive referred to is not described in detail since it is commercially availble, see circulars Nos. GEC–1530E, October 1964 and GEA–7560A, December 1964, published by General Electric Company. In one successful commercial apparatus embodying the invention herein disclosed the motor 11 was a General Electric Company motor K445, 150 H.P. 220/440 1800 r.p.m. AC motor, and the coupling 75 was a Model 5EC488C51, G1142 water cooled eddy current coupling 150 H.P. 1685/100 r.p.m. and the control included a tachometer follower 76. On the same apparatus a similar motor and coupling was employed to drive the calender rolls. The drive sensed variation in torque and maintained a constant back pressure in the die in a manner understood in the art. While a particular mechanism has been mentioned for maintaining a constant back pressure in the extruding die, it is to be understood that this mechanism is merely illustrative of other mechanisms capable of performing the same function of maintaining a constant back pressure in the extruding die and which may be substituted therefore.

From the foregoing description of the preferred embodiment of the invention it will be apparent that the objects heretofore enumerated and others have been accomplished and that there has been provided a novel and improved combination sheet or slab extruder and calendering apparatus in which the extruder part of the apparatus is movable toward and from the calender part and which comprises a slot-type die split through the die slot and adapted to have one part thereof, preferably the upper part, more or less permanently connected to and carried by the calendering part of the apparatus and the other part of the die connected to and carried by the extruding part of the apparatus so that the die may be conveniently opened for cleaning, servicing, etc., by moving the extruder part of the apparatus away from the calender part.

While the preferred embodiment of the invention has been shown and described in considerable detail, the invention is not limited to the particular embodiment of the apparatus shown and described, and it is the intention to hereby cover all adaptations, modifications and uses thereof which may come within the practice of those skilled in the art to which the invention relates and within the scope of the appended claims.

Having described my invention, what I claim is:

1. In apparatus for producing sheets or slabs of extrudable material, extruding apparatus, calendering apparatus located adjacent the discharge end of said extruding apparatus, a slot-type die interposed between said discharge end of said extruding apparatus and said calendering apparatus, said die being split through the slot thereof parallel with the length of the slot thus forming at least two die parts, means connecting one of said die parts to said extruding apparatus, and means connecting another of said die parts to said calendering apparatus.

2. In apparatus for producing sheets or slabs of extrudable material, calendering apparatus, extruding apparatus having its discharge end located adjacent said calendering apparatus, means supporting said extruding apparatus for movement toward and from said calendering apparatus, a slot-type die interposed between said discharge end of said extruding apparatus and said calendering apparatus, said die being split through the slot thereof parallel with the length of the slot thus forming at least two die parts, means connecting one of said die parts to said extruding apparatus for movement with said extruding apparatus toward and from said calendering apparatus, means connecting another of said die parts to said calendering apparatus, and means detachably holding said die parts together when said extruding apparatus is adjacent to said calendering apparatus.

3. Apparatus for producing sheets or slabs of extrudable material as claimed in claim 2 wherein the means detachably holding the die parts together is at least in part power actuated.

4. A die for use with processing apparatus having first and second members, the first of which is a part of an extruder, said first and second members being selectively movable relative to one another between an operating position adjacent to one another and a servicing position spaced from one another, said die having: (a) a through die cavity terminating in a slot-like discharge orifice adapted to be located adjacent to said second member and being split through said orifice parallel with the length thereof into cooperating first and second die members each having a portion of the die cavity therein, (b) means for connecting said first and second die members, respectively, to said first and second processing apparatus members for movement therewith between said operating and said servicing positions, and (c) an inclined surface on one of said die members cooperable with wedge means of one of said first and second processing apparatus members when said first and second members are adjacent to one another for holding said die members closely adjacent to each other in said operating position.

References Cited

UNITED STATES PATENTS

| | | | |
|---|---|---|---|
| 1,603,812 | 10/1926 | Stein | 18—11 XR |
| 2,175,961 | 10/1939 | Kampfer. | |
| 2,514,211 | 7/1950 | Carlson. | |
| 2,628,386 | 2/1953 | Tornberg. | |
| 2,734,224 | 2/1956 | Winstead. | |
| 3,116,194 | 12/1963 | Looser. | |
| 3,212,461 | 10/1965 | Fritzberg. | |
| 3,274,645 | 9/1966 | Chase. | |

WILLIAM J. STEPHENSON, *Primary Examiner.*